United States Patent [19]

Lange

[11] Patent Number: 4,543,042

[45] Date of Patent: Sep. 24, 1985

[54] WINDMILL ROTOR

[76] Inventor: Heinz Lange, P.O. Box 1374, Merritt, British Columbia, Canada

[21] Appl. No.: 666,185

[22] Filed: Oct. 29, 1984

[51] Int. Cl.[4] .............................................. F03D 3/06
[52] U.S. Cl. ............................ 416/197 A; 416/227 A; 98/72
[58] Field of Search ........ 416/227 A, 197 A, DIG. 8, 416/DIG. 9, 119; 98/72, 69

[56] References Cited

U.S. PATENT DOCUMENTS

| | | |
|---|---|---|
| 227,842 | 5/1880 | Rudolph . |
| 725,829 | 4/1903 | Decker . |
| 1,413,861 | 4/1922 | McDowell ................ 416/197 A X |
| 1,706,163 | 3/1929 | Howe . |
| 1,766,765 | 6/1930 | Savonius . |
| 2,518,611 | 8/1950 | Geiger . |
| 3,267,833 | 8/1966 | Artis et al. ................................ 98/72 |
| 3,918,839 | 11/1975 | Blackwell et al. .................. 416/175 |
| 4,020,565 | 5/1977 | Steffen ..................................... 34/93 |
| 4,115,032 | 9/1978 | Lange .............................. 416/227 A |
| 4,408,956 | 10/1983 | Price ..................................... 416/119 |

FOREIGN PATENT DOCUMENTS

| | | |
|---|---|---|
| 30854 | 2/1889 | Canada . |
| 48160 | 1/1895 | Canada . |
| 102168 | 6/1906 | Canada . |
| 142668 | 3/1911 | Canada . |
| 232433 | 8/1919 | Canada . |
| 232283 | 4/1920 | Canada . |
| 683650 | 4/1964 | Canada ..................................... 98/72 |
| 1054522 | 5/1979 | Canada . |
| 2721450 | 11/1978 | Fed. Rep. of Germany ... 416/227 A |
| 524142 | 8/1921 | France ............................ 416/197 A |
| 2298707 | 1/1975 | France . |
| 327062 | 7/1935 | Italy . |
| 95794 | 5/1939 | Sweden ........................... 416/197 A |
| 28266 | of 1912 | United Kingdom . |

Primary Examiner—Everette A. Powell, Jr.

[57] ABSTRACT

A windmill rotor of the vertical axis type having at least three main blades mounted symmetrically around a shaft and bowing outwardly to define a generally sphere-like chamber. Each main blade has a secondary blade mounted on its inner surface, and the secondary blade is movable under centrifugal force as the rotor turns. An auxiliary blade is provided adjacent to and ahead of the secondary blade to act as a scoop for the wind to provide the rotor with additional thrust at low speed. The auxiliary blade is positioned so that, as the speed of the rotor increases and the secondary blade moves outwardly, the scoop formed by the auxiliary blade is shielded from the wind, thus reducing or eliminating the additional thrust at high rotational speeds. The avoids damage to the rotor in high winds.

8 Claims, 5 Drawing Figures

WINDMILL ROTOR

BACKGROUND OF THE INVENTION

I. Field of the Invention

This invention relates to a windmill rotor, that is to say, a device for converting the energy of wind into the mechanical rotation of a shaft and subsequently, if desired, into some other form of energy, such as by driving an electric generator or operating a pump or the like.

II. Description of Prior Art

More specifically, the invention relates to a vertical shaft windmill rotor, i.e. a windmill rotor that turns about a vertical axis in absorbing the energy of the wind, the wind being assumed to travel in an essentially horizontal direction. In particular, the invention is an improvement of the windmill rotor described in my Canadian Pat. No. 1,054,522 issued on May 15, 1979 and in my corresponding U.S. Pat. No. 4,115,032 issued on Sept. 19, 1978, the disclosure of which is incorporated herein by reference.

The windmill rotors described in these prior patents have proved to be highly effective but I have now found that their efficiency at low wind speeds can be significantly improved by incorporating a modification which forms the subject of the present specification.

Accordingly, an object of the present invention is to provide an improved windmill rotor of the type shown in my prior patents.

Another object of the invention is to provide an improved windmill rotor of the said type that has improved performance at low wind speeds but which can also operate efficiently and safely at high wind speeds.

Another object of the invention is to provide an improved windmill rotor of the said type which is relatively simple in design and economical to manufacture.

Another object of the invention is to provide a windmill rotor of the above-mentioned type having an increased flywheel effect so that it turns fairly evenly in erratic wind conditions.

SUMMARY OF THE INVENTION

The invention relates to an improvement of a windmill rotor of the type referred to above having a plurality of at least three plate-like main blades connected symmetrically around a shaft. Each main blade bows outwardly so that collectively the blades define a generally sphere-like chamber. Each main blade has a plate-like secondary blade mounted on its inner surface defining a gap between the main and secondary blades. The gap has a gap entrance and a gap exit. Each secondary blade is movable relative to the main blade under centrifugal force between a first position occupied at rest or at low rotational speeds and having a wide gap entrance and a narrower gap exit, and a second position occupied at high rotational speeds and having a narrow or substantially closed gap entrance. The improvement provided by the present invention comprises a plate-like auxiliary blade mounted on the inner surface of each main blade adjacent to and ahead of said secondary blade in the direction of rotation. The auxiliary blade defines a scoop with the main blade for receiving said wind and deriving thrust therefrom. The scoop has an entrance at the trailing edge of the auxiliary blade and an exit at the leading edge of the auxiliary blade, the scoop entrance being wider than the scoop exit. Furthermore, the scoop entrance is substantially no wider than the gap exit when the secondary blade is in its second position so that wind is then deflected away from the scoop.

Before describing the present invention in detail it will be helpful to define some of the terms as used in this application.

Firstly, the terms "leading" and "trailing" are used in connection with the normal direction of rotation of the rotor. Accordingly, an edge of a blade which first reaches any given fixed point as the rotor turns is referred to as its "leading edge". Moreover, an edge of a blade which reaches the fixed point last is referred to as the "trailing edge".

The chamber defined by the main blades of the rotor has been described as "sphere-like". The exact shape depends on the manner in which the main blades are attached to the rotor shaft and may be a perfect sphere, or a somewhat distorted sphere, e.g. a prolate or oblate spheroid or even an "onion-shape". Thus the term "sphere-like" is intended to include all such spherical and distorted spheroid shapes.

Reference is also made to the widths of various gaps or scoops. Such widths are generally horizontal distances, assuming that the rotor shaft is mounted vertically.

DESCRIPTION OF THE DRAWINGS

A preferred embodiment of the invention is described below with reference to the accompanying drawings, in which.

DETAILED DESCRIPTION OF A PREFERRED EMBODIMENT

Figure 1:
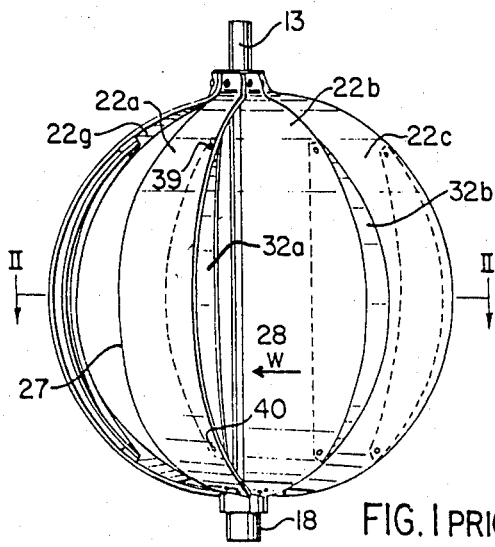
FIG. 1 is a side elevation of a windmill rotor of the type shown in my previous patents referred to above.
Figure 2:
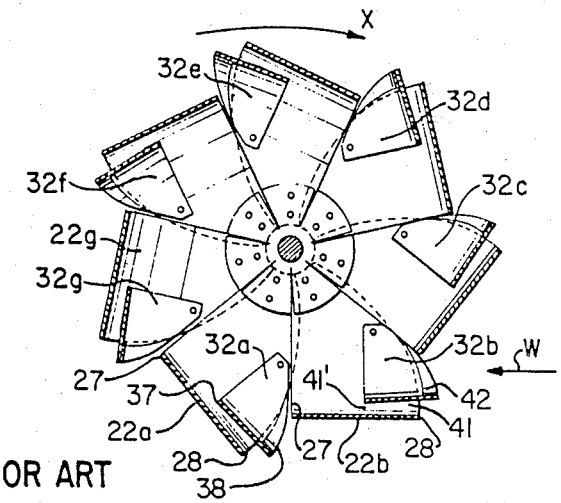
FIG. 2 is a cross sectional plan view taken on the line II—II of FIG. 1.

As stated in the introduction of this specification, my invention relates to an improvement of the windmill rotors shown in my previous patents and particularly FIGS. 8 to 13 of those patents. FIGS. 1 and 2 of the accompanying drawings are provided to illustrate this known invention and these drawings correspond to FIGS. 8 and 10 of the previous patents. A brief discussion of the known invention will be provided below in order to make the present invention more readily understandable.

FIG. 1 shows a windmill rotor mounted on a vertical shaft 13 which is provided with a bushing 18 at its lower end. The bushing is mounted in a bearing assembly (not shown) which permits the rotor and shaft 13 to turn about a vertical axis. The rotor has a plurality of plate-like blades 22a to 22g each connected to the shaft at their upper and lower ends and being outwardly bowed to collectively define a sphere-like chamber. Each blade, for example 22a, has a leading edge 27 and a trailing edge 28 (the terms "leading" and "trailing" refer to the direction of rotation of the rotor when driven by wind W, this direction of rotation being indicated by arrow X in FIG. 2).

Leading edge 27 is generally straight and extends generally vertically. As explained in my previous patents, by "straight" I mean that the edge was straight when the blade was cut from a flat sheet but is now bowed and occupies a vertical plane. Trailing edge 28 is convex extending outwardly from its narrow ends to a central portion where the blade attains its maximum width. Furthermore, trailing edge 28, especially at its wide central portion, projects further from the axis of the shaft 13 than the leading edge 27 of the next trailing blade 22b (see FIG. 2). Thus the blades form "scoops" directed into the wind which cause the rotor to rotate.

Each blade 22a–22g carries a plate-like secondary blade 32a–32g mounted on its inner surface. Taking secondary blade 32a as an example (the others being identical), it will be seen from FIGS. 1 and 2 to be similar in shape to, while smaller in size than, the main blade 22a, having a straight leading edge 37 and convex trailing edge 38. The top and bottom ends of the secondary blade 32a are secured by screw or rivet connections 39 and 40 to the main blade 22a. The secondary blade may be made of lighter, more flexible metal, e.g. aluminum, than the main blade, which is preferably made of steel. Also the secondary blade may be weighted with a strip 42 of a suitable heavy material, such as lead.

The relative orientation of the main and secondary blades shown in FIG. 2 pertains to the static condition of the windmill and during rotation at relatively low speeds. The trailing edge 38 of each secondary blade projects beyond the trailing edge 28 of the main blade and this enhances the "scoop" effect. In addition, there is also a "jet effect" or "venturi effect" caused by wind entering a gap entrance 41 between the blades. The gap entrance 41 narrows to a smaller gap exit 41', thus causing an increase to the air velocity by the time it emerges into the chamber defined within the windmill. This "jet effect" has been found to improve the performance of the device.

As the windmill rotor increases speed, the centrifugal force on the weighted trailing edge 38 of the secondary blade has the effect of narrowing the gap entrance 41, but the jet effect essentially remains. However, at high speed, the centrifugal force can close or almost close the gap entrance 41 so that it is narrower than gap exit 41' and the contribution made by the secondary blade to the turning moment or torque of the rotor is reduced or eliminated. Moreover, the trailing edge 38 of the secondary blade projects beyond the trailing edge 27 of the main blade, i.e. at a greater distance from the shaft 13. This creates drag and tends to slow the rotor. The inner surface of the secondary blade also directs air from the inner surface of the main blade towards the centre of the rotor and thus reduces the impact of the wind on the inner surface of the main blade. As a result of all of these effects, the rotor remains stable at high wind speeds.

Figure 3:
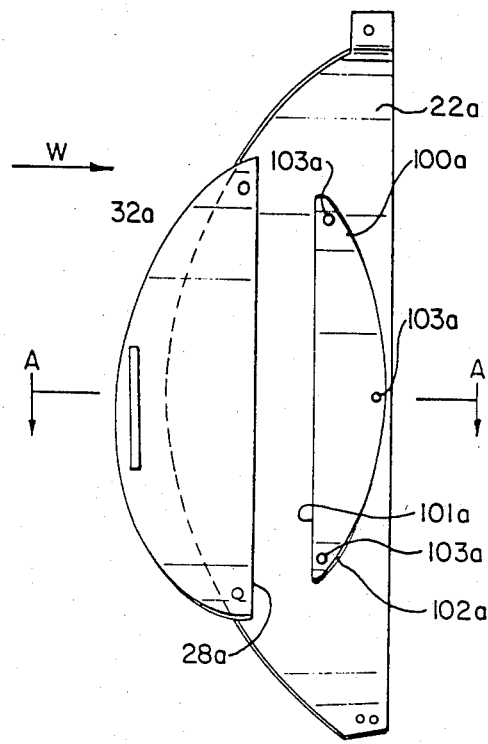
FIG. 3 is an elevational view of a main blade according to a preferred embodiment of the present invention showing the inner surface.
Figure 4:
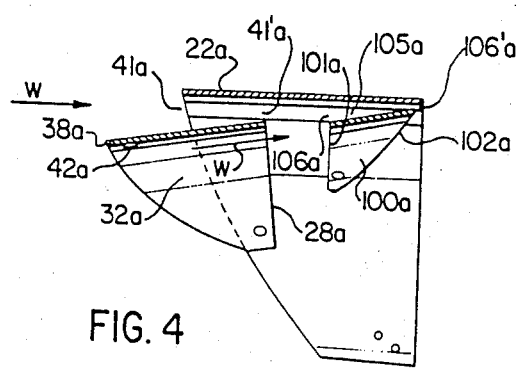
FIG. 4 is a cross-sectional plan view taken on the line A—A of FIG. 3 and showing the condition of the blade at rest or low rotational speeds.
Figure 5:
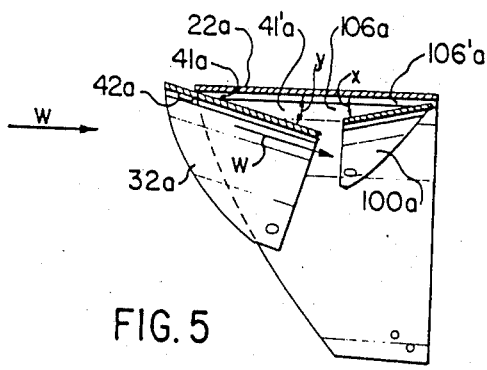
FIG. 5 is a cross-sectional plan view taken on the line A—A of FIG. 3 and showing the condition of the blade at high rotational speeds.

A preferred embodiment of the present invention is shown in FIGS. 3 to 5 of the accompanying drawings and is described in detail below. FIGS. 3 to 5 use the same reference numerals as FIGS. 1 and 2 for equivalent parts.

Basically, the preferred embodiment of the invention has the same construction as the rotor shown in FIGS. 1 and 2 with an additional element provided on the inner surface of each blade, as explained below.

FIG. 3 shows the inner surface of blade 22a as an example (the other blades being essentially identical). This view of blade 22a would be obtained by looking into the rotor from the side opposite that of the known rotor shown in FIG. 1. Accordingly, the wind direction W in FIG. 3 is from left to right as shown by the arrow. The blade 22a is identical to that of the known rotor except for the addition of a small plate-like auxiliary blade 100a located adjacent to and forward of (considering the normal direction of rotation of the rotor) the secondary blade 32a. This blade has a straight trailing edge 101a and a curved leading edge 102a and is curved in its longitudinal direction so that it follows to some extent the inner contour of the main blade 22a. The auxiliary blade is fixed to the main blade by three screws or rivets 103a and differs from secondary blade 32a in that it does not move relative to the main blade 22a as the speed of the rotor increases or decreases.

As can be seen best from FIGS. 4 and 5, which are cross sectional views of the blade shown in FIG. 3, the trailing edge 101a of the auxiliary blade is spaced by a greater distance from the main blade 22a than the leading edge 102a. Thus the auxiliary blade forms a tapering "scoop" 105a having a wide entrance 106a at the trailing edge and a narrow exit 106a at the leading edge.

FIG. 4 shows the relative positions of the main blade 22a, the secondary blade 32a and the auxiliary blade 100a which are adopted when the rotor is at rest or is spinning slowly. As explained previously in connection with the known rotor, in this condition the width of gap entrance 41a is larger than the width of gap exit 41'a and air passing through gap exit 41'a is of increased velocity relative to the air entering gap entrance 41a because of the "jet effect". In the present embodiment, the air leaving gap exit 41'a enters scoop 105a and thus exerts an additional thrust on the rotor via auxiliary blade 100a and main blade 22a. Moreover, air passing over the inner surface of secondary blade 32a (i.e. the surface closest to the shaft 13) may also enter the scoop 105a as shown by arrow w and thus exert an additional force on the rotor to cause it to rotate.

In effect, scoop 105a increases the total surface area on which wind W can exert pressure and consequently increases the turning moment provided by the wind. This effect is increased by the fact that the air of increased velocity leaving exit gap 41'a is channeled directly into scoop 105a.

The small scoop exit 106'a is provided at the leading edge of scoop 105a in order to permit air to leave the scoop. If the scoop 105a were closed at the leading edge, air entering the scoop would also have to leave by the large scoop entrance 106a and turbulence would be set up which would have a negative effect on the efficiency of the rotor. The small scoop exit 106'a also results in the air being accelerated as it passes through the scoop 105a and a "jet effect" is produced as previously explained in connection with secondary blade 32a. The size of the scoop exit 106'a is not critical except that it should be narrower than scoop entrance 106a but should not be so narrow that unacceptable turbulence is established. A gap of about ¼–½ inch is preferred in most cases.

The above description applies to the situation when the blade encounters the wind in the direction shown by the arrow W. As the blade rotates around the axis of the rotor, it will eventually encounter wind from the opposite direction. However, as previously explained, the main blade 22a is then effectively sheltered from the wind by the trailing edge of the next leading blade and anyway the surfaces of the main, secondary and auxiliary blades are inclined to the wind in such a way that less force is exerted on the blade by the wind than when the wind is encountered in the direction shown by arrow W.

The auxiliary blade 100a enables the rotor to derive more energy from the wind at low wind speeds and also enables the rotor to self-start at a lower wind speed. However, at high wind speeds the additional force resulting from the incorporation of the auxiliary blade is undesirable because it could result in the rotor spinning faster than its design limits would allow. This is avoided in the present invention by positioning the auxiliary blade in such a manner that air is deflected away from scoop 105a as the speed of rotation increases. This is explained by reference to FIG. 5 which shows the relative positions of the main blade 22a, the secondary blade 32a and the auxiliary blade 100a which are adopted when the rotor spins at high speed, e.g. close to its maximum permissible speed.

As explained previously, as the speed of rotation increases, the trailing edge 38a of secondary blade 32a moves outwardly under centrifugal force. This action is assisted by the strip 42a of relatively heavy material and the relatively flexible nature of the secondary blade. The movement of the trailing edge tends to close gap entrance 41a and in addition the inner surface of the secondary blade tends to deflect the wind past the scoop 105a as shown by arrow w in FIG. 5. Consequently, the additional force provided by the auxiliary blade 100a is automatically reduced or eliminated as the speed of the rotor increases but comes into play once again as the rotor speed decreases and the secondary blade returns to the position shown in FIG. 4.

The dimensions of the auxiliary blade, the spacing of its trailing edge from the main blade and the horizontal separation between the secondary blade and the auxiliary blade should be such that the wind is substantially or completely deflected away from the scoop 105a by the secondary blade when the rotor approaches its maximum safe speed. At the same time, the scoop 105a should preferably be as large as possible in order to collect the maximum additional force from the wind at low wind speeds.

Proper deflection of the wind is assured by making the width of the scoop entrance 106a (the distance x in FIG. 5) substantially no larger than the width of the gap exit 41'a (the distancy y in FIG. 5) when the secondary blade is in the position shown in FIG. 5. The secondary blade then shields the scoop defined by the auxiliary blade from the incoming wind.

For an average size rotor, the scoop entrance 106a would normally be in the range of from 1½ to 3½ inches and ideally 2 inches.

Naturally, the vertical dimension of the auxiliary blade should be substantially no greater than the vertical dimension of the secondary blade or the intended shielding effect will not be efficiently obtained.

The auxiliary blade should be located close to the leading edge of the secondary blade, but not so close that the blades contact each other as the secondary blade flexes.

An additional benefit provided by the auxiliary blade 100a is that it increases the mass of the rotor at the maximum distance from the rotor axis. Thus, the rotor has a greater flywheel effect and turns more stably at low wind speeds or when the wind is gusty and varies quickly between low and high speeds.

The auxiliary blade can be made of any material that does not deform unduly under normal working conditions and is preferably made of the same material as the main blade 22a, e.g. thin steel sheeting.

Using the improvement of this invention gains of about ¼ hp (200 watts) have been achieved at low wind speeds compared with identical rotors not having the auxiliary blade. Moreover, it has been found that a useful amount of energy can be generated at wind speeds of around 15 mph rather than 25 mph for the known rotor.

The description above is of a preferred embodiment of the invention. However, modifications and improvements will occur to persons skilled in this art and such are included within the spirit and scope of this invention.

I claim:

1. In a windmill rotor for obtaining energy from wind, having a plurality of at least three plate-like main blades connected symmetrically around a shaft, each main blade bowing outwardly so that said main blades collectively define a generally sphere-like chamber, and each main blade having a plate-like secondary blade mounted on its inner surface defining a gap between the main and secondary blades and having a gap entrance and a gap exit, each said secondary blade being movable relative to the main blade under centrifugal force between a first position occupied at rest or at low rotational speeds and having a wide gap entrance and a narrow gap exit and a second position occupied at high rotational speeds and having a narrow or substantially closed gap entrance; the improvement which comprises a plate-like auxiliary blade mounted on the inner surface of each main blade adjacent to and ahead of said secondary blade in the direction of rotation, said auxiliary blade defining with said main blade a scoop for receiving said wind and deriving thrust therefrom, said scoop having an entrance at the trailing edge of the auxiliary blade and an exit at the leading edge of the auxiliary blade, said scoop entrance being wider than said scoop exit and being substantially no wider than said gap exit when said secondary blade is in its second position.

2. A rotor according to claim 1 wherein the vertical dimension of the auxiliary blade is less than that of the secondary blade.

3. A rotor according to claim 1 wherein the trailing edge of the secondary blade is straight and the leading edge is convex.

4. A rotor according to claim 1 wherein the secondary blade and the auxiliary blade are both bowed to an extent similar to that of the main blade.

5. A rotor according to claim 1, wherein the main blade and the auxiliary blade are made of steel.

6. A rotor according to claim 5 wherein the secondary blade is made of aluminum.

7. A rotor according to claim 1 wherein the entrance of the scoop has a width of 1½ to 3½ inches.

8. A rotor according to claim 7 wherein the exit of the scoop has a width of up to ½ inch.

* * * * *